United States Patent
Sinha

(10) Patent No.: US 9,197,616 B2
(45) Date of Patent: Nov. 24, 2015

(54) OUT-OF-BAND SESSION KEY INFORMATION EXCHANGE

(75) Inventor: Alok Kumar Sinha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 520 days.

(21) Appl. No.: 12/727,493

(22) Filed: Mar. 19, 2010

(65) Prior Publication Data

US 2011/0231659 A1   Sep. 22, 2011

(51) Int. Cl.
*H04L 29/06* (2006.01)

(52) U.S. Cl.
CPC ............... *H04L 63/06* (2013.01); *H04L 63/18* (2013.01); *H04L 2463/062* (2013.01)

(58) Field of Classification Search
CPC ... H04L 9/3263; H04L 29/06; H04L 63/0823; H04L 63/08; H04L 63/0428; H04L 63/10; H04L 63/04; H04L 63/029; G06F 21/62; G06F 21/606; G06F 21/60; G06F 21/33; G06F 21/00
USPC ........................................................ 713/168
See application file for complete search history.

(56) References Cited

U.S. PATENT DOCUMENTS

| | | | | |
|---|---|---|---|---|
| 5,825,890 A * | 10/1998 | Elgamal et al. | ................ | 713/151 |
| 5,835,726 A * | 11/1998 | Shwed et al. | ................. | 709/229 |
| 7,055,027 B1 * | 5/2006 | Gunter et al. | ................. | 713/151 |
| 8,356,177 B2 | 1/2013 | Mcgrew et al. | | |
| 2005/0188193 A1 * | 8/2005 | Kuehnel et al. | ................ | 713/155 |
| 2006/0239208 A1 * | 10/2006 | Roberts et al. | ................ | 370/254 |
| 2009/0220080 A1 | 9/2009 | Herne et al. | | |

OTHER PUBLICATIONS

A. Goodloe, and C. A. Gunter. Design Principles for Gateway Discovery Protocols. Nov. 2006.*
T. Dierks, 'The Transport Layer Security (TLS) Protocol', Version 1.2, RFC 5246, Aug. 2008.*
Ray, Marsh, and Steve Dispensa. "Renegotiating TLS." (2009).*

* cited by examiner

*Primary Examiner* — Syed Zaidi
(74) *Attorney, Agent, or Firm* — Campbell Stephenson LLP

(57) ABSTRACT

A source device that plans to participate in one or more encrypted communication sessions with a destination device sends a discovery message towards the destination device. An intermediary device that processes this discovery message requests a master key from the source device. The source verifies that the intermediary device is a trusted device and then sends the intermediary device the requested master key. Prior to transmitting encrypted messages to the destination device, the source device sends session key information, encrypted using the master key, to the intermediary device. The intermediary device uses this session key information to decrypt and process encrypted messages sent as part of the encrypted communication session between the source device and the destination device.

20 Claims, 6 Drawing Sheets

OUT-OF-BAND SESSION KEY INFORMATION EXCHANGE

FIELD OF THE INVENTION

This invention relates generally to networking and, more particularly, to processing encrypted messages being transmitted via a network.

BACKGROUND

In many situations, it is desirable to encrypt communications sent over a network. For example, various government regulations such as the Health Insurance Portability and Accountability Act (HIPAA), the Gramm-Leach-Bliley Act (GLBA), and the Payment Card Industry Data Security Standard (PCI DSS) require the use of encryption, even on private networks. Such regulations can be satisfied by configuring network devices, such as routers, to encrypt messages received from client machines before transmitting those messages over the network. Receiving network devices then decrypt the transmitted messages before passing the messages to the recipient client machines.

Intermediary network devices within the network typically perform various types of processing (e.g., to apply various policies) on transmitted messages. Unfortunately, some of this processing may not be possible unless the transmitted messages are decrypted prior to being processed. If the intermediary network devices are unable to decrypt encrypted messages, the intermediary network devices may not be able to perform the desired processing. Absent the ability to process the encrypted messages, these intermediary network devices will only be able to apply very basic policies (e.g., such as a policy specifying that all encrypted messages are to be dropped) to encrypted traffic. This may in turn negatively affect overall network performance or even prevent the effective communication of encrypted messages within the network.

BRIEF DESCRIPTION OF THE DRAWINGS

A more complete understanding of the present invention may be acquired by referring to the following description and the accompanying drawings, in which like reference numbers indicate like features.

Figure 1:
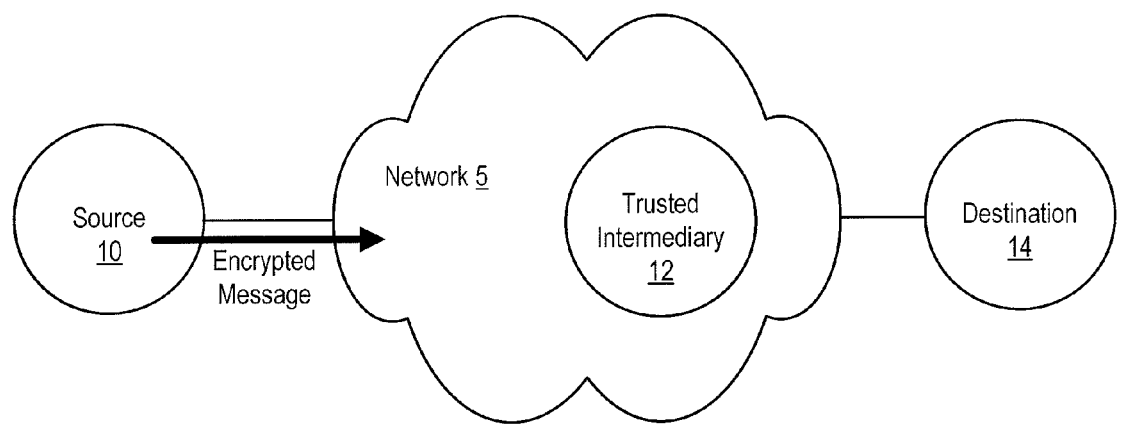
FIG. 1 is a block diagram of a system in which intermediary devices can participate in an out-of-band session key information exchange with a source device, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Overview

A source device that plans to participate in one or more encrypted communication sessions with a destination device sends a discovery message towards the destination device. Intermediary devices that process this discovery message are able to detect that the source device intends to transmit encrypted messages over the network prior to any such messages actually being transmitted.

In response to processing a discovery message, an intermediary device can request a master key from the source device. Subsequent to receiving the master key and prior to the source beginning to transmit encrypted messages to the destination device, the intermediary device can participate in an out-of-band session key information exchange with the source (such exchanges are initiated by the source). The intermediary device uses the master key to decrypt messages sent by the source as part of the out-of-band session key information exchange. These messages can contain session key information that allows the intermediary device to decrypt messages sent form the source device to the destination device during the encrypted communication session.

Once this out-of-band session key information exchange has completed, the intermediary device possesses the information needed to decrypt the encrypted messages sent by the source device during the encrypted communication session. If the intermediary device receives an encrypted message that is sent by the source device as part of the encrypted communication session prior to completion of the out-of-band exchange, the intermediary device can temporarily store that encrypted message for processing after completion of the out-of-band exchange. Accordingly, this technique can allow the intermediary device to potentially decrypt and process all encrypted messages sent by the source device during the encrypted communication session.

Example Embodiments

FIG. 1 is a block diagram of a system in which intermediary devices can participate in an out-of-band session key information exchange with a source device. As shown in FIG. 1, a source device 10 is coupled to a network 5, which includes a trusted intermediary device 12. Source device 10 can send an encrypted message to a destination device 14 via network 5.

Network 5 can include one or more storage, local, and/or wide area networks. Network 5 can be implemented using various topologies, communication protocols, and physical links (e.g., wireless links, coaxial cables, and the like). Network 5 may include both logical and physical links.

Source device 10 and destination device 14 can be network devices (e.g., routers, switches, bridges, gateways, or the like). Source device 10 and/or destination device 14 can alternatively be end devices, host devices, or client devices (e.g., such as personal computers). For example, source device 10 can be a home computing device or mobile device that implements a web browser that is configured to participate in a secured exchange of information with a web server. Similarly, destination device 14 can be a server computing device that implements a web server.

Source device 10 is configured to encrypt a message and to send the encrypted message to destination device 14 as part of an encrypted communication session established between source device 10 and destination device 14. In some situations, there may be multiple encrypted communication sessions established between the source and one or more destinations at the same time; however, each session can be handled separately for purposes of communicating session key information to trusted intermediary devices, as described in more detail below.

Destination device 14 may also be configured to send encrypted messages to source device 10; however, destination device 14 is behaving as a source device in that scenario. In other words, destination device 14 can behave in the same manner as source device 10 (as described below) when destination device 14 is acting as a source device.

In order for destination device 14 to be able to successfully decrypt the encrypted message sent by source device 10, destination device 14 needs to have access to session key information (e.g., one or more pieces of information such as information identifying a decryption algorithm, a decryption key, information identifying a decompression algorithm, and the like) that is usable to decrypt messages encrypted by source device 10 in a particular session. Destination device 14 can obtain session key information usable to decrypt messages encrypted by source device 10 by participating in a secured exchange of messages with source device 10. Such an exchange can be conducted according to a security protocol such as Secured Socket Layer (SSL), Transport Layer Security (TSL), Internet Protocol Security (IPsec), and the like. The exchange can, in some embodiments, communicate a message that includes the session key information itself. However, in alternative embodiments, the session key information itself may not be included in any of the messages being exchanged; instead, the exchange of messages may involve sending messages that contain information usable to generate or otherwise identify the session key information.

As shown in FIG. 1, source 10 sends an encrypted message to destination 14 via network 5. Trusted intermediary 12 is a network device (e.g., a router, bridge, switch, gateway, or the like) operating within network 5. Trusted intermediary 12 receives encrypted messages being communicated from source device 10 to destination device 14 and can selectively process those messages before (or instead of) forwarding and/or routing those messages towards their ultimate destination.

The message processing performed by trusted intermediary 12 can take one or more of many different forms. For example, trusted intermediary 12 can be a policy enforcement device such as a firewall, Unidirectional Link Detection (URLF) device, lawful intercept device, Wide Area Application Services (WaaS) core device, or the like. Such devices process messages in order to ensure that messages sent via network 5 are sent in a manner that complies with one or more policies. Such policies can facilitate various functionality, including searches for protocol non-compliance, virus detection, spam detection, intrusion detection, and the ability to use predefined criteria to identify additional actions to be performed for the messages (e.g., to collect statistical information). To properly process messages, however, trusted intermediary 12 needs to be able to access decrypted versions of the messages. In other words, trusted intermediary 12 needs access to the decrypted payload (also referred to as "plaintext") of these messages. This type of processing, which requires access to the decrypted payload (i.e., non-header portion) of messages, is often referred to as deep packet inspection (DPI). If trusted intermediary 12 is not able to process a message in the desired manner, trusted intermediary 12 will handle the message in a predefined manner (e.g., by allowing all encrypted messages, dropping all encrypted messages, or the like). As noted above, this may negatively impact network performance.

In order to allow trusted intermediaries within network 5 to be able to operate properly, source device 10 is configured to send a discovery message towards each destination device (e.g., such as destination device 14) to which source device 10 intends to send encrypted messages. Source device 10 can send this discovery message prior to actually sending any encrypted messages to that destination. A discovery message is special out-of-band message (e.g., as indicated by a special type field in its header and/or a special value in its payload) that indicates source device 10's intent to send encrypted messages. Discovery messages are not encrypted.

Typically, discovery messages (and other similar out-of-band messages) will be discarded (e.g., in response to a special type field in their headers and/or a special value in their payloads) by the destination device to which the discovery messages are sent. Alternatively, the last network device within network 5 to process the discovery message can be configured to drop all discovery messages (e.g., in response to a special type field in their headers and/or a special value in their payloads) instead of sending those messages on to a recipient such as destination device 14.

In at least some embodiments, out-of-band messages like these are control messages conveyed in the control plane of the network. These messages are referred to as "out-of-band" messages since they are conveyed independently of any related encrypted data sent between the source and destination. Thus, the out-of-band messages are not sent as part of any related encrypted communication session between the source and destination devices.

In response to processing a discovery message, trusted intermediary 12 will attempt to establish a relationship with the source 10. In particular, trusted intermediary 12 will send a request for a master key to source 10. Once a master key is established between trusted intermediary 12 and source 10, source 10 can send one or more sets of encrypted session key information to trusted intermediary 12, and trusted intermediary 12 can use the master key to decrypt such sets of session key information. Trusted intermediary 12 can then use each set of session key information to decrypt messages sent from source 10 to destination 14 in a respective encrypted communication session.

Trusted intermediary 12 begins the process of establishing a master key relationship with source 10 by sending a request (sent in another special out-of-band message) for a master key to the source device 10. In order to maintain the security of the master key, the request may also include one or more credentials (e.g., such as a digital certificate from a certificate authority) belonging to trusted intermediary 12. Alternatively, such credentials can be provided via a subsequent exchange of messages, which is used by the source to verify that the intermediary is a trusted intermediary.

Trusted intermediary 12 can use addressing information (e.g., a source address field in the header or addressing information contained within the payload) within the discovery message to address the request to the source device 10. For example, trusted intermediary 12 can use the source address in the header of the discovery message as the destination address of a message containing the request. Like the discovery message, a message containing the request can be identified by a special field within the message header and/or a special value within the message payload.

In response to receiving a request from trusted intermediary 12, source device 10 can use the credential(s) provided (e.g., in the request or in a subsequent exchange of messages) by trusted intermediary 12 to verify that trusted intermediary 12 is indeed a trusted device. This verification process may involve source device 10 sending one or more messages to one or more other devices, depending upon the desired level of security and/or the type of credential presented. (Trusted intermediary 12 may similarly verify source device 10.) Once source device 10 has verified that trusted intermediary device 12 is a trusted device, source device 10 will send (e.g., in yet another special out-of-band message) a master key to trusted intermediary device. The master key can be sent in a secured manner (e.g., the master key can be encrypted using a public key indicated in the trusted intermediary's digital certificate). The master key will be used to encrypt one or more sets of decryption key information prior to sending those sets of decryption key information to trusted intermediary device 12.

In response to receiving the master key from source device 10, trusted intermediary 12 stores the master key, along with information indicating that the master key is associated with source device 10. This allows trusted intermediary 12 to maintain different master keys for different source devices. If trusted intermediary 12 subsequently receives an encrypted out-of-band message (e.g., containing session key information) from source device 10, trusted intermediary 12 can use the master key associated with source device 10 to decrypt the message's payload.

Before sending encrypted messages to destination device 14 as part of an encrypted communication session, source device 10 encrypts session key information (e.g., a session key and/or information usable to generate the session key) for that session using the master key, and then sends the encrypted session key information to trusted intermediary 12. Trusted intermediary 12 receives the message (e.g., another special out-of-band message) and uses the master key to decrypt the message's payload, from which trusted intermediary 12 extracts the session key information (if the key itself is not provided, trusted intermediary 12 also uses the related information to generate the session key). Trusted intermediary 12 stores this session key information for future use, along with information identifying the session, source device 10, and/or destination device 14. This allows trusted intermediary to maintain more than one set of session key information (e.g., each associated with a different source/destination pair and/or each associated with a different session between the same source/destination pair) at the same time.

The session key information for a given encrypted communication session is sent to trusted intermediary 12 in a manner that is separate from the transmission of encrypted messages as part of that encrypted communication session. One consequence of this is that the session key information only needs to be conveyed to trusted intermediary 12 one time; after that, the trusted intermediary 12 can decrypt multiple encrypted messages in that session using the received session key information. Additionally, the session key information does not need to be included in each encrypted message sent by the source device.

As an encrypted message is sent from source device 10 to destination device 14 via trusted intermediary 12, trusted intermediary 12 accesses the appropriate session key information (e.g., based upon information in the encrypted message's header identifying the source, destination, and/or session). Trusted intermediary 12 then uses the appropriate session key information to decrypt the encrypted message's payload. This in turn allows trusted intermediary 12 to perform deep packet inspection on the now-decrypted message and to take any appropriate actions (e.g., according to preconfigured policies) based upon that deep packet inspection.

The same master key can be used to encrypt multiple different sets of session key information sent to the same trusted intermediary. Accordingly, once a trusted intermediary has received a master key from a source device, that trusted intermediary can decrypt multiple different sets of session key information sent from that source device to the trusted intermediary. This eliminates the need for the trusted intermediary to go through the process of requesting the session key information for each individual encrypted communication session in which the source device is participating. Instead, the source device can automatically send such information before that information is needed (i.e., before the trusted intermediary specifically requests such session key information and/or before the source device begins sending encrypted messages in the corresponding session).

By sending discovery messages to potential destination devices, source device 10 will be able to establish master keys with at least some of the intermediary devices within network 5 that process packets being sent from the source to those potential destination devices. In particular, a discovery message that is successfully sent to a particular destination device will be handled by each intermediary network device along a route from the source device to the destination device. As such, those intermediary devices along that route will process (and presumably respond to by sending a request for a master key) the discovery message.

In some embodiments, several alternative routes may exist between the source device and a particular destination device. In these embodiments, the source device (if aware that there are multiple routes to the destination device) may send a discovery message to the destination device along each possible route.

Figure 2:
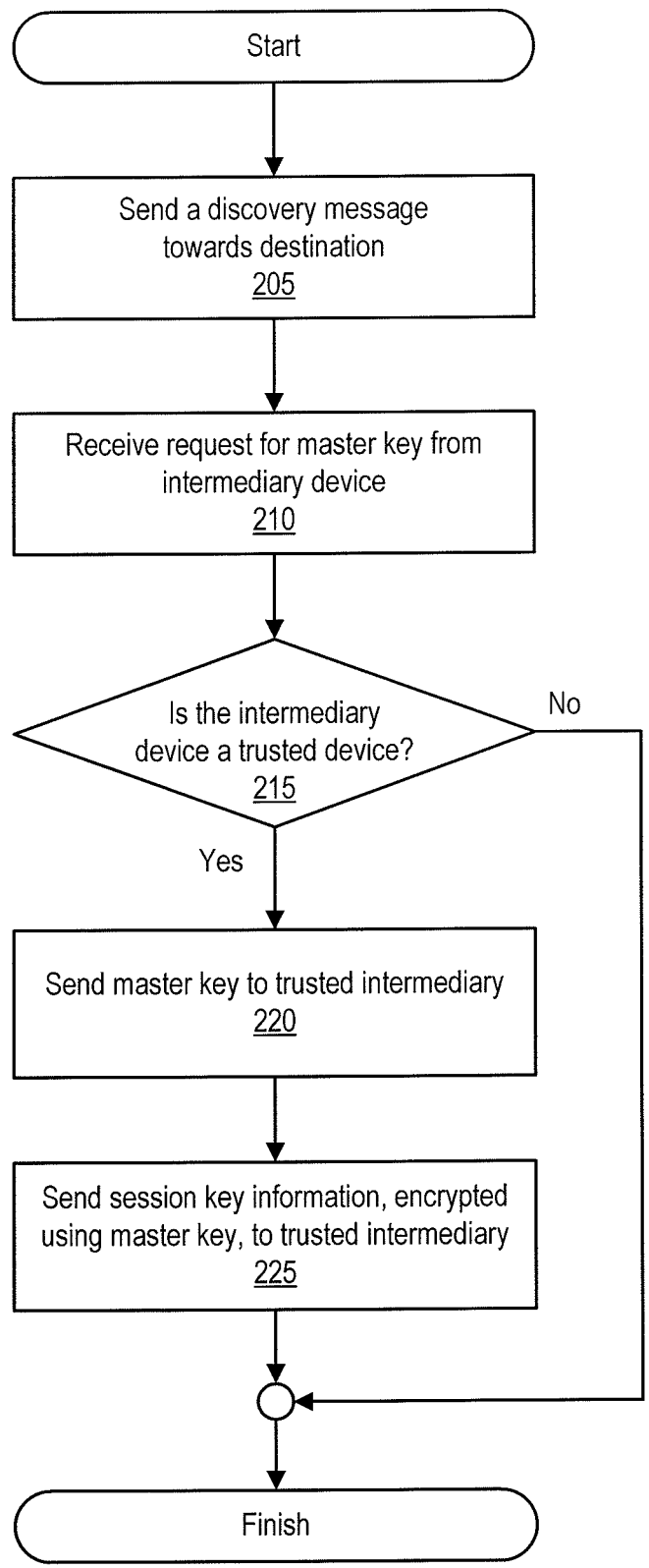
FIG. 2 is a flowchart of a process that can be implemented by a source device to support an out-of-band session key information exchange, according to one embodiment.

FIG. 2 is a flowchart of a process that can be implemented by a source device (e.g., such as source device 10 of FIG. 1) to support an out-of-band session key information exchange with a trusted intermediary device (e.g., such as trusted intermediary 12 of FIG. 1).

The process begins at 205, when the source device sends a discovery message towards a destination device. Operation 205 can be performed in response to the source device detecting an event (e.g., user selection of a particular hyperlink in a web browser, if the source device is a client computing device; display of a particular web page in a web browser, if the source device is a client computing device; receipt of a particular type of request message, if the source device is a network device; user selection of an option to send a discovery message; and the like) that indicates that the source device is likely to soon begin sending encrypted messages to the destination device as part of one or more encrypted communication sessions.

Performance of operation 205 involves sending a special out-of-band message that is not a normal data message. This out-of-band message can be identified as a special message by the inclusion of one or more special values in its header and/or payload that differentiate this message from other types of control and data traffic. The special out-of-band message is designed to notify intermediary devices that process the special out-of-band message that the sender may begin sending encrypted traffic via the network. By sending the special out-of-band message to the destination device (e.g., by using an address of the destination address as the destination address of the special message), the source device can contact all intermediary devices (or at least all such intermediary devices that are capable of recognizing and processing special out-of-band messages) along at least one route from the source device to the destination device.

Subsequent to sending the discovery message, the source device can receive a request for a master key from each intermediary device that processed the discovery message, as indicated at 210. The request can itself be included within a special out-of-band message.

In response to receiving a request for a master key from an intermediary device, the source device verifies that the intermediary device is a trusted device, as indicated at 215. Operation 215 can be performed using information (e.g., such as one or more security credentials like digital certificates) included within the request, or by requesting such information from the intermediary device and/or a security server.

If the intermediary device is a trusted device, as determined at 215, the source device will send a master key to the trusted intermediary, as shown at 220. If instead the intermediary device is an untrusted device, the out-of-band session key information exchange will end without providing the master key to the untrusted intermediary.

Sending the master key to the trusted intermediary can involve inserting the master key into a special out-of-band message and sending that master key to the specific trusted intermediary verified at 215. In some situations, the source device can send the same master key to several different trusted intermediaries.

In order to secure the master key, the source device encrypts the master key prior to sending it to the trusted intermediary. For example, the trusted intermediary device may provide its public key (e.g., in a digital certificate) to the source device in the request (received by the source device at 210). The source device can use this public key to encrypt the master key before sending the master key to the trusted intermediary. Thus, in at least some embodiments, even though the source device can provide the same master key to multiple different trusted intermediaries, communication of the master key may be performed in a secured manner that is unique to each trusted intermediary that receives the master key.

The source device can, in some embodiments, maintain multiple different master keys. The source device can determine which, if any, of these master keys to send to a particular intermediary device based upon the results of the verification of the intermediary device (e.g., as performed at 215). For example, the source device can associate each master key with a different privilege level. Intermediary devices at a given privilege level (e.g., as determined during verification) will be sent the master key associated with that privilege level. In some embodiments, the particular number of privilege numbers may be configured by a user (e.g., via interaction with the source device via a graphical user interface, command line interface, or the like).

After sending a master key to a trusted intermediary, the source device can then use the master key to encrypt one or more sets of session key information. The encrypted session key information can then be sent to the trusted intermediary device, as shown at 225. The encrypted session key information can be sent directly (e.g., in a special out-of-band message addressed to the trusted intermediary) or indirectly, as described below.

As noted above, in some embodiments, the encrypted session key information can be sent to a trusted intermediary in an indirect manner. This can involve including the encrypted session key information in a special out-of-band message and sending that message to the destination device (e.g., an address of the destination device can be used as the destination address of the special message). This allows one or more intermediary devices along the route to the destination device to process the special out-of-band message and, if those devices have the appropriate master key, decrypt and save the session key information contained within that message. This technique can reduce the amount of network traffic needed to disseminate the session key information to the appropriate trusted intermediary devices. If the trusted intermediaries to which the session key information is to be provided use different master keys, at least one message, containing session key information encrypted with a respective one of those different master keys, will need to be sent for each different master key currently in use.

The source device generally sends the session key information for a given encrypted communication session prior to transmitting any encrypted messages in that session. However, in some situations, the source device may send some encrypted messages to the destination device prior to sending the associated session key information to the trusted intermediary device. This may result in acceptable intermediary device performance for certain types of policies (e.g., lawful intercept, firewall policies that default to allowing encrypted traffic, and the like). However, other types of policies (e.g., firewall policies that default to dropping all encrypted traffic) may require that all encrypted messages be subject to deep packet inspection for acceptable intermediary device performance. Techniques for ensuring that the trusted intermediary device can process all encrypted messages sent in an encryption session in order to satisfy such policies are described in more detail below.

Once the source device has provided a master key to a trusted intermediary device, the source device can send multiple different sets of session key information, each encrypted with the master key, to that trusted intermediary device (e.g., again using one or more special out-of-band messages). For example, the source device can initially send the discovery message before the source has begun participating in any encryption sessions with a destination device. Subsequent to sending a master key to a trusted intermediary, the source device can send the session key information for an encryption session. Subsequently, the source device may participate in one or more other encryption sessions (these sessions can be with the same or different destination device as the first encryption session). Before participating in these subsequent encryption sessions, the source device can simply use the same master key to encrypt the appropriate session key information for those subsequent sessions and send that encrypted information to the trusted intermediary device. The source device does not need to send a new discovery message or reestablish the master key relationship with the trusted intermediary before sending the additional information for the subsequent encryption sessions. Furthermore, the source device can send this additional information unprompted. In other words, intermediary device does not need to (and thus does not) request new session key information from the source device for each session that the source device participates in. Instead, the intermediary device only needs to initially request a master key, as discussed above.

In some situations, in order to provide a desired level of security, the source device may routinely (e.g., on a periodic basis, or in response to predetermined stimuli) refresh the master key maintained by a given trusted intermediary device. In these situations, the source device can refresh a master key by generating a new version of that master key and sending that new version to the appropriate trusted intermediary device(s).

In some situations, the source device may selectively send certain sets of session key information to certain trusted intermediaries, such that not all trusted intermediaries receive the same set of session key information. For example, if the source device maintains different master keys for different privilege levels, the source device can also correlate each set of session key information with one or more of the privilege levels. The session key information can be encrypted with the appropriate master key, given the session key information's associated privilege level, and then sent to only those intermediary devices that received that particular master key.

Certain encryption sessions are established in a manner that further constrains the timing of when session key information is sent to a trusted intermediary. For example, security protocols such as TLS and IPsec use encryption to communicate the information that is ultimately used to generate the session key information for a session. Accordingly, in order for such security protocols to be able to successfully establish an encrypted communication session between the source device and a destination device, the intermediary device cannot drop these encrypted messages being used to establish the session. If the intermediary device is configured to drop all encrypted messages that the intermediary device cannot decrypt and inspect, the source device will have to provide the intermediary device with the appropriate session key information in time to allow the intermediary device to process these encrypted session-establishment messages.

As an example, TLS implements a handshake protocol to establish session key information for a session. There are three parts to this handshake protocol: negotiation, source-to-destination ChangeCipherSpec message communication, and destination-to-source ChangeCipherSpec message communication. During the negotiation stage, communications are not encrypted. These communications allow the source and destination to negotiate the encryption algorithm, encryption keys, and the like. After this stage, the source device sends a ChangeCipherSpec message to the destination device, indicating that subsequent communications from the source device will be encrypted using the negotiated keys. The source device follows this message by sending an encrypted Finished message to the destination device. The destination device similarly sends a ChangeCipherSpec message and encrypted Finished message to the source device.

To allow this TLS handshake protocol to complete, the trusted intermediary will need the session key information for the session prior to being able to process the Finished message. Accordingly, the source device can be configured to send the encrypted (using the appropriate master key) session key information to the trusted intermediary prior to sending the Finished message. The source device can send this information as soon as possible after the negotiation stage completes and prior to sending the ChangeCipherSpec message.

That said, network conditions may result in the trusted intermediary nevertheless receiving an encrypted message (e.g., the Finished message) prior to receiving the session key information usable to decrypt that message. Accordingly, the trusted intermediary may be configured to temporarily queue (e.g., for the duration of a timeout period) any encrypted messages received prior to receipt of the appropriate session key information. If the session key information is received during the time that the encrypted message is queued, the trusted intermediary can then use the session key information to decrypt the queued encrypted message. If the session key information is not received during the time period that the encrypted message is temporarily queued, the trusted intermediary will apply its default policy (e.g., to drop the encrypted message) to the encrypted message at the end of the time period.

As another example, IPSec involves an initiation stage (IKE_SA_INIT) in which the security keys and algorithm are established. Messages exchanged between the source and destination during the initiation stage are not encrypted. In the subsequent authentication stage (IKE_AUTH) of encryption session establishment using IPSec, messages are encrypted. Accordingly, the source device can be configured to send the appropriate session key information to the trusted intermediary as soon as this information is established in the initiation stage, prior to sending any message in the subsequent authentication stage. Similarly, the trusted intermediary device can be configured to temporarily queue any encrypted messages received prior to the corresponding session key information.

Figure 3:
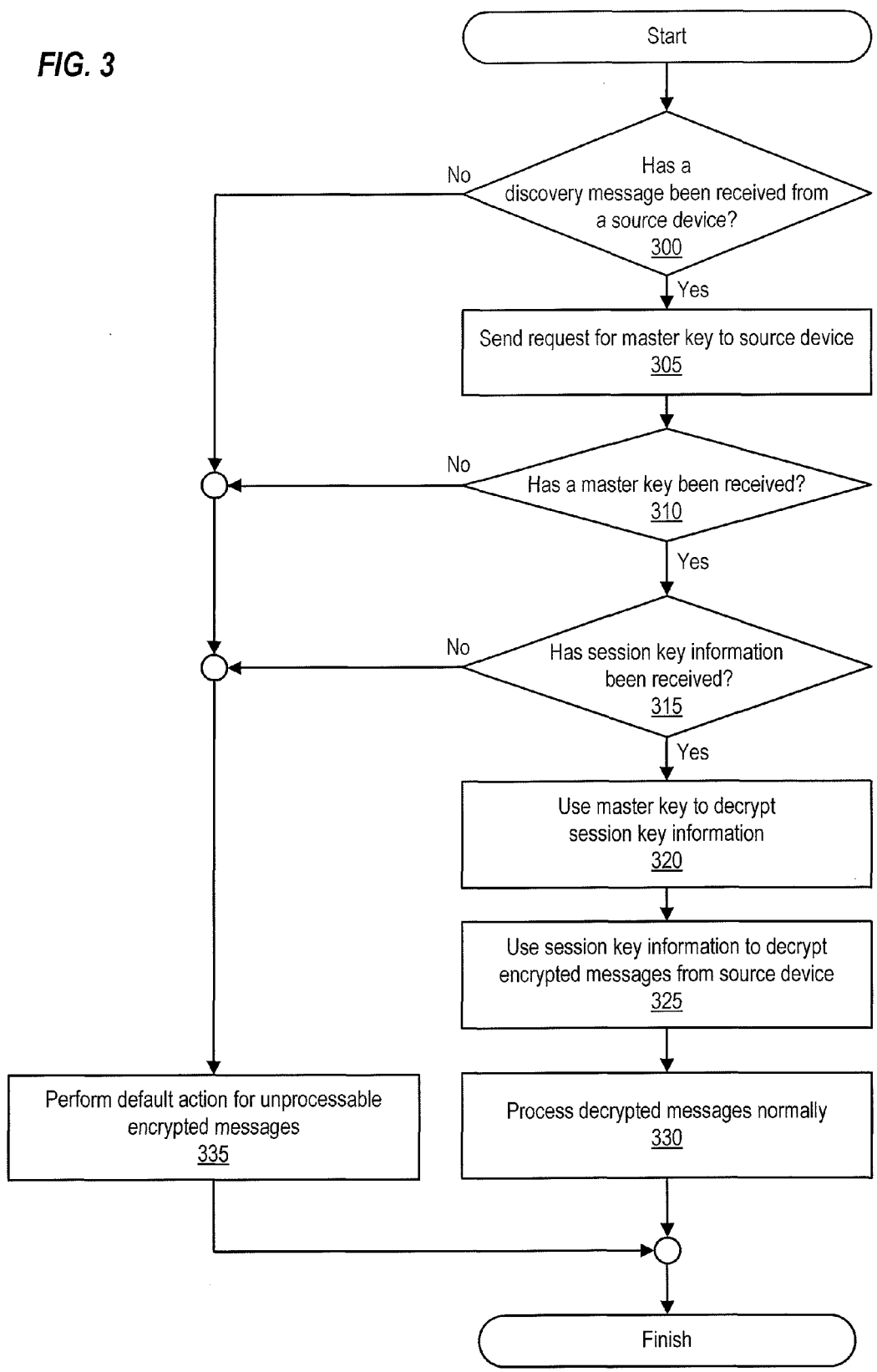
FIG. 3 is a flowchart of a process that can be implemented by an intermediary device to support an out-of-band session key information exchange, according to one embodiment.

FIG. 3 is a flowchart of a process that can be implemented by an intermediary device (e.g., intermediary device 12 of FIG. 1) to support an out-of-band session key information exchange. The intermediary device is configured to participate in out-of-band session key information exchanges with source devices in order to obtain session key information usable to decrypt messages encrypted by the source device.

During normal operation, the intermediary device receives and processes messages. Processing the messages requires that the messages' payloads be decrypted. Accordingly, if the intermediary device has not obtained session key information usable to decrypt a given encrypted message, the intermediary device will apply a default action (e.g., such as either allowing or dropping all encrypted messages) for that encrypted message, as shown at 335.

In order to obtain session key information, the intermediary device watches for discovery messages from source devices. In response to receiving a discovery message being sent from a source device to a destination device, as shown at 300, the intermediary device can send a request for a master key to the source device, as shown at 305. After processing the discovery message to generate a request, the intermediary device can forward the discovery message towards the destination device.

To perform operation 305, the intermediary device can extract the source device's address from the source address field of the discovery message and generate a request message (e.g., sent as a special out-of-band message) having the extracted address as its destination address. The request can also include one or more security credentials (e.g., such as a digital certificate) as well as a public encryption key belonging to the intermediary device.

After sending a request for a master key, the intermediary device waits to receive the master key from the source device, as shown at 310. In response to receiving the master key, the intermediary device saves the master key for later use. The master key can be saved along with information identifying the source device that sent the master key.

After receiving a master key, the intermediary device can receive one or more sets of session key information, as detected at 315. A set of session key information may, in some situations, be received indirectly (e.g., each set of session key information may be received while that information is in the process of being sent to the destination device), in which case the intermediary device will forward the set of session key information on towards the destination device after receiving it. Alternatively, the source device may send the set of session key information to the intermediary device (e.g., the destination address of the message containing the set of session key information may identify the intermediary device instead of the destination device). Each set of session key information can be received without previously having been specifically requested by the intermediary device.

The received session key information is encrypted using the master key. Thus upon receiving a set of session key information, the intermediary device can use the master key to decrypt the session key information, as shown at 320. The intermediary device can then store this session key information for future use. The session key information can be associated with information identifying the source device that sent the decryption key information, a session in which the source device is exchanging encrypted messages with a destination device, the destination device, and the like. This associated information can be used to determine which set of session key information, if any, should be used to decrypt a given encrypted message.

Once the intermediary device has received the needed session key information, the intermediary device can begin using that session key information to decrypt encrypted messages sent by the source device, as shown at 325. The intermediary device can then process these decrypted messages normally, as shown at 330, instead of only being able to perform a default action, as would be the case if the intermediary device was unable to decrypt those messages.

As noted above in the description of FIG. 2, in certain situations, if the intermediary device does not yet have the appropriate session key information needed to decrypt an encrypted message, the intermediary device can temporarily store or queue the encrypted message. For example, upon receiving an encrypted message, the intermediary device can access the header of the encrypted message to identify the source device for the message. If the intermediary device has already established a master key with that source device, the intermediary device can temporarily queue or buffer the encrypted message (otherwise, the intermediary device may immediately apply the default action to the encrypted message). If the intermediary device receives the session key information usable to decrypt that message while the message is still being queued or stored, the intermediary device can then decrypt and normally process the message. If the intermediary device does not receive the session key information before the time period allowed to temporarily store the encrypted message elapses, the intermediary device will perform the default action on the encrypted message at the end of the time period.

While the intermediary device is requesting a master key from one source device, the intermediary device can simultaneously be processing messages sent by other source devices, requesting master keys from other source devices, and the like. Thus, the particular operations shown in FIG. 3 can be performed in parallel with similar operations performed for other sessions, sources, messages, and the like.

Figure 4:
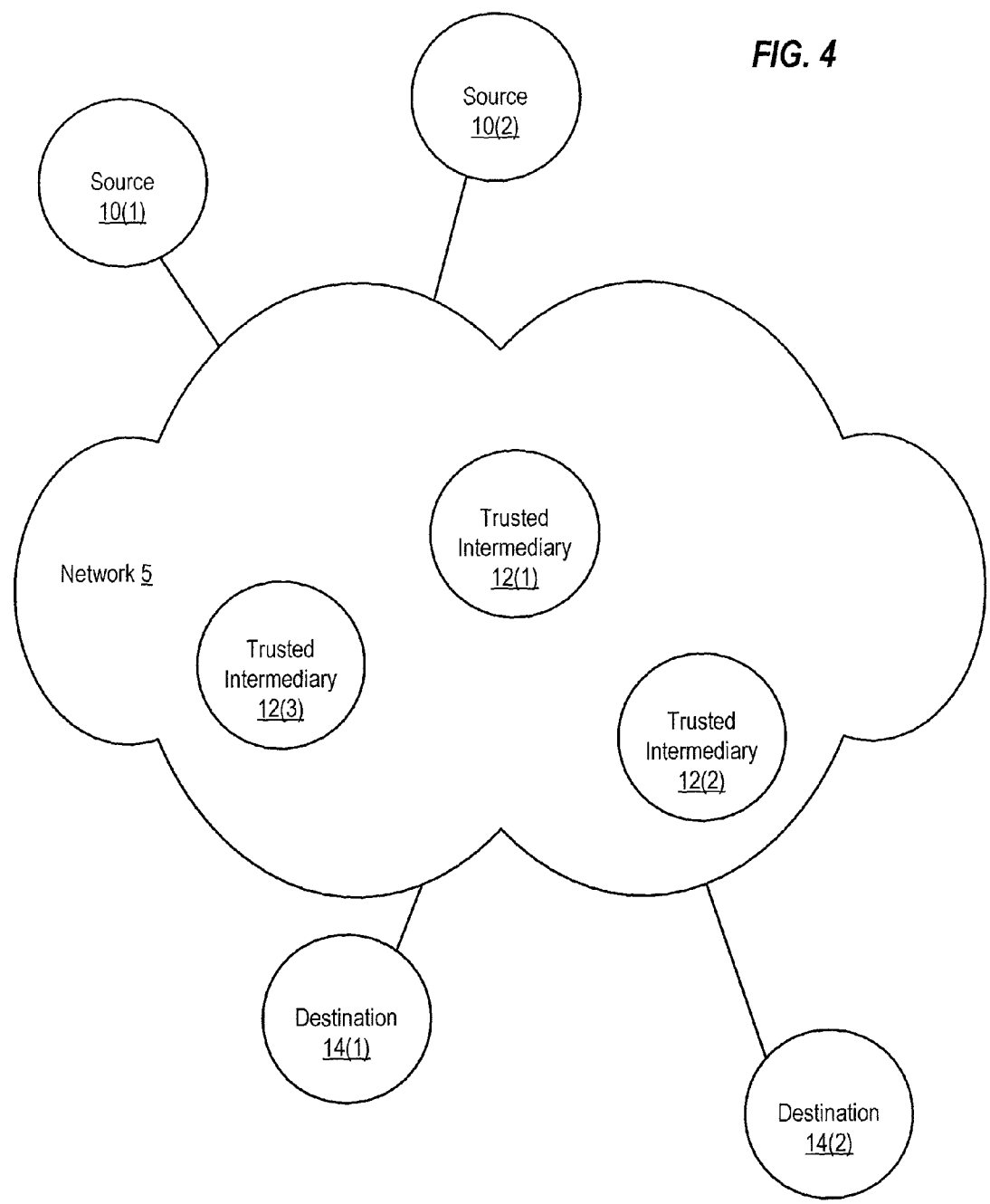
FIG. 4 is a block diagram of another system in which intermediary devices can participate in an out-of-band session key information exchange with a source device, according to one embodiment.

FIG. 4 is a block diagram of another system in which intermediary devices can participate in an out-of-band session key information exchange with source devices. This block diagram illustrates a more complex network configuration than the simplified example presented in FIG. 1. In particular, this block diagram shows how there can be multiple intermediary network devices and/or multiple destination devices. FIG. 4 also shows how there can be multiple source devices.

Here, there are two sources 10(1) and 10(2). Each source can send encrypted messages to either of the two destination devices 14(1) and 14(2). The network 5 coupling the sources to the destinations includes three trusted intermediary devices 12(1), 12(2), and 12(3).

FIG. 4 is used to illustrate a scenario in which source 10(1) can send a discovery message to destination 14(1) in anticipation of sending encrypted messages to destination 14(1). This discovery message can travel through network 5 along a route that includes trusted intermediary 12(1) and trusted intermediary 12(3). When trusted intermediary 12(1) processes this discovery message, trusted intermediary requests a master key from source 10(1). Trusted intermediary 12(1) then sends the discovery message to trusted intermediary 12(3), which prompts trusted intermediary 12(3) to also request a master key from source 10(1).

In response to receiving the master key request from trusted intermediary 12(1), source 10(1) can determine that trusted intermediary 12(1) is a trusted device and, in response, send a master key to trusted intermediary 12(1). Source 10(1) can similarly process trusted intermediary 12(2)'s request. Both trusted intermediary 12(1) and trusted intermediary 12(2) can be provided with the same master key.

Prior to sending encrypted traffic to destination 14(1) in an encrypted communication session, source 10(1) uses the master key to encrypt the appropriate session key information and sends the encrypted session key information towards destination 14(1). Like the discovery message, the message containing the encrypted session key information travels through network 5 along the route that includes trusted intermediaries 12(1) and 12(3). As each trusted intermediary 12(1) and 12(3) processes this message, that trusted intermediary uses the master key to decrypt the message and extract the session key information. The two trusted intermediaries can then use the extracted session key information to decrypt encrypted messages being sent from source 10(1) to destination 14(1) in the corresponding session.

Over time, source 10(1) may end its current session with destination 14(1) and start a new session (alternatively, source 10(1) can start one or more new sessions in parallel with a current session). Before sending encrypted messages in the new session, source 10(1) can send a new set of session key information, encrypted with the same master key, to trusted intermediaries 12(1) and 12(3). Thus, source 10(1) can use the same master key to encrypt multiple sets of session key information. Furthermore, trusted intermediaries only need to request a master key from source 10(1) once; after that, source 10(1) can provide sets of session key information to the trusted intermediaries as needed, without the trusted intermediaries needed to request that information or to obtain a new master key.

Sometime after providing a master key to trusted intermediaries 12(1) and 12(3), source 10(1) can send a discovery message to destination 14(2) in anticipation of sending encrypted messages to destination 14(2). The discovery message travels through network 5 along a route that includes trusted intermediaries 12(1) and 12(2). Trusted intermediary 12(1) has already received a master key from source 10(1), and thus trusted intermediary 12(1) can (in at least some embodiments) process the discovery message without generating a new request for a master key. After processing the discovery message, trusted intermediary 12(1) forwards the discovery message to trusted intermediary 12(2).

Since trusted intermediary 12(2) has not yet established a master key with source 10(1), trusted intermediary 12(2) will send a request for a master key to source 10(1). When processing the request, source 10(1) can determine that trusted intermediary 12(2) has a different privilege level than trusted intermediaries 12(1) and 12(3). Accordingly, source 10(1) can send a different master key (which corresponds to the different privilege level) to trusted intermediary 12(2).

Prior to sending encrypted messages to destination 14(2), source 10(1) can encrypt the appropriate session key information using each master key associated with an appropriate privilege level. Thus, if the privilege level associated with the first master key (sent to trusted intermediaries 12(1) and 12(3)) applies to these communications, source 10(1) will encrypt the session key information with this master key and send the encrypted information towards destination 14(2). Trusted intermediary 12(1) will be able to decrypt this session key information using its master key, but trusted intermediary 12(2), which has a different master key, will not.

If the privilege level associated with trusted intermediary 12(2)'s master key also applies to these communications, source 10(1) can also use this second master key to encrypt the session key information, and then send the encrypted information towards destination 14(2). Here, trusted intermediary 12(1) cannot decrypt the encrypted information but trusted intermediary 12(2) will be able to decrypt the information.

In some situations (e.g., where privilege levels are implemented), a source device may provide more than one master key to a given trusted intermediary. For example, if trusted intermediary 12(1) has a higher level of privilege than trusted intermediary 12(2), and if the higher privilege level is associated with a first master key and the lower level of privilege is associated with a second master key, source 10(1) may provide both the first and second master keys to trusted intermediary 12(1) but only the second master key to trusted intermediary 12(2). Alternatively, instead of associating different master keys with different privilege levels, the source may associate each set of session key information with a particular privilege level and only forward session key information to trusted intermediary devices directly.

As the above examples show, there are many different ways in which source device 10 can manage the distribution of master keys and session key information to trusted intermediaries within the same network. Many other variations are possible.

Figure 5:
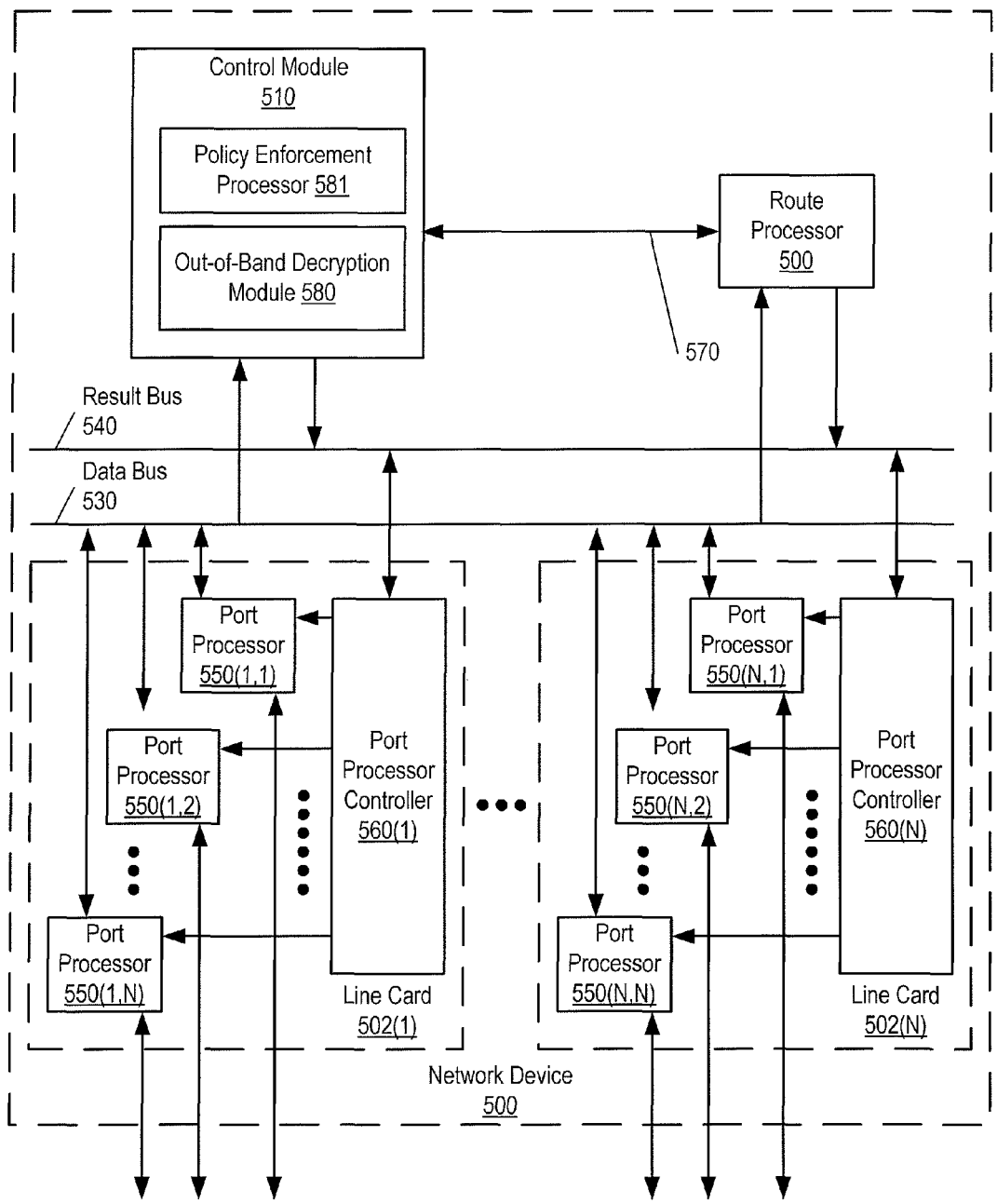
FIG. 5 is a block diagram of a network device, according to one embodiment.

FIG. 5 is a block diagram of a network device 500 (e.g., source device 10 (if source device 10 is a network device, as opposed to a general computing device or the like) and/or intermediary device 12 of FIG. 1). In this depiction, network device 500 includes a number of line cards (line cards 502(1)-502(N)) that are communicatively coupled to a control module 510 (which can include a forwarding engine, not shown) and a route processor 500 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 500 are not only coupled to one another via data bus 530 and result bus 540, but are also communicatively coupled to one another by a communications link 570. In alternative embodiments, each line card can include its own forwarding engine.

When a message (e.g., a special out-of-band message) is received, the message is identified and analyzed by a network device such as network device 500 in the following manner. Upon receipt, a message (or some or all of its control information) is sent from one of the port processors 550(1,1)-550(N,N) at which the message was received to one or more of those devices coupled to data bus 530 (e.g., others of port processors 550(1,1)-550(N,N), a forwarding engine, and/or route processor 500). Handling of the message can be determined, for example, by a forwarding engine. For example, a forwarding engine may determine that the message should be forwarded to one or more of port processors 550(1,1)-550(N,N). This can be accomplished by indicating to corresponding one(s) of port processor controllers 560(1)-560(N) that the copy of the message held in the given one(s) of port processors 550(1,1)-550(N,N) should be forwarded to the appropriate one of port processors 550(1,1)-550(N,N).

Network device 500 can implement an out-of-band decryption module 580 (e.g., in control module 510, as shown, or in one of port processor controllers 560(1)-560(N) and/or in route processor 500) in order to act as a source device and/or intermediary device. Out-of-band decryption module can thus implement one or more of the methods illustrated in FIGS. 2 and 3.

If network device 500 is an intermediary device, network device 500 can implement policy enforcement processor 581 (e.g., in control module 510, as shown, or in one of port processor controllers 560(1)-560(N) and/or in route processor 500). Such a policy enforcement processor can implement a policy enforcement device such as a firewall, Unidirectional Link Detection (URLF) device, lawful intercept device, Wide Area Application Services (WaaS) core device, or the like.

Figure 6:
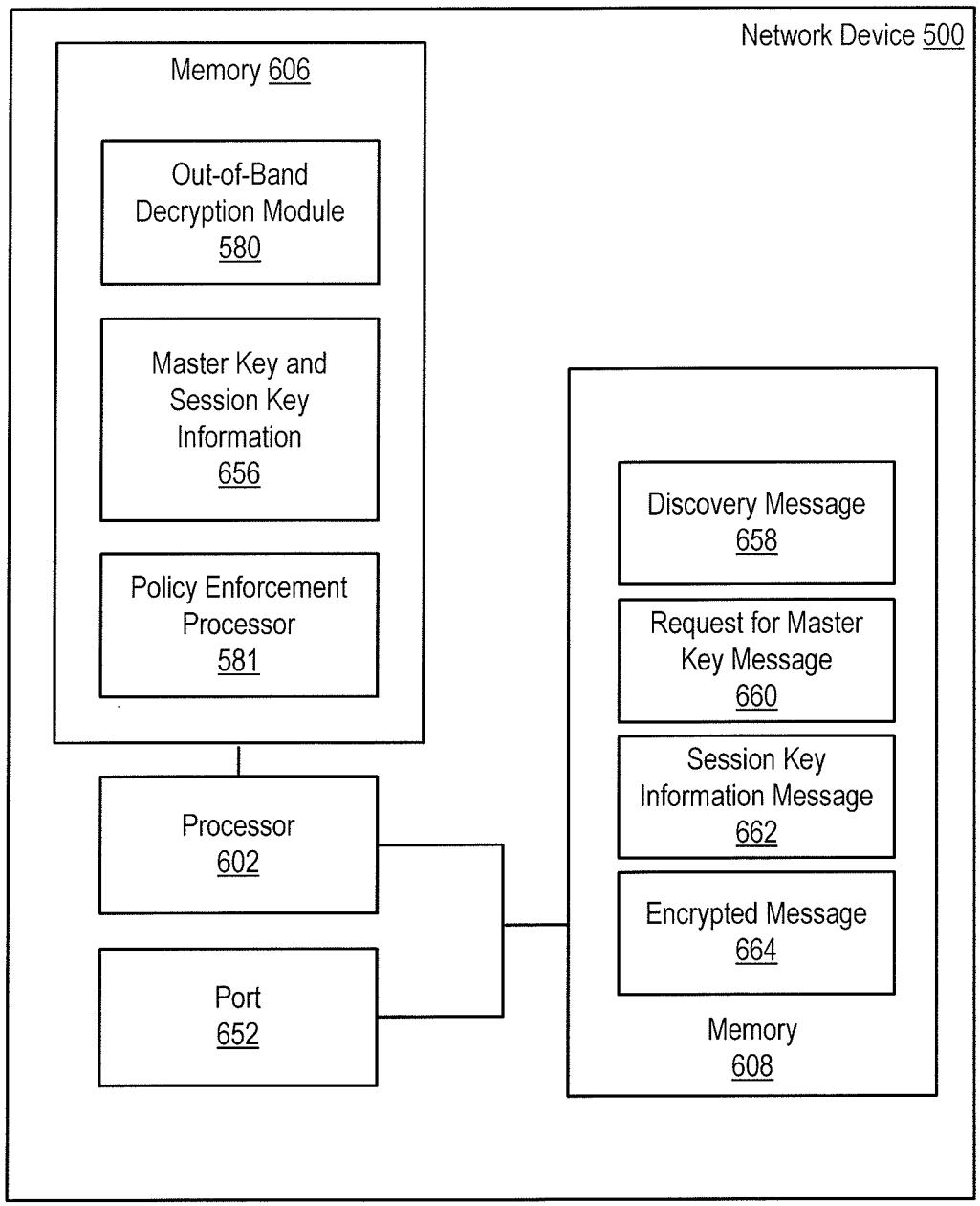
FIG. 6 is a block diagram of a network device, which illustrates how an out-of-band decryption module can be implemented in software, according to one embodiment.

FIG. 6 is a block diagram of a network device, illustrating how an out-of-band decryption module can be implemented in software. As illustrated, network device 500 includes one or more processors 602 (e.g., microprocessors, PLDs (Programmable Logic Devices), or ASICs (Application Specific Integrated Circuits)) configured to execute program instructions stored in memories 606 and/or 608. Memories 606 and 608 can include various types of RAM (Random Access Memory), ROM (Read Only Memory), Flash memory, MEMS (Micro Electro-Mechanical Systems) memory, and the like. Network device 600 also includes one or more ports 652 (e.g., one or more hardware ports or other network interfaces that can be linked to other network devices, hosts, servers, storage devices, or the like). Processor 602, port 652, and memories 606 and 608 are coupled to send and receive data and control signals by one or more buses or other interconnects.

In this example, program instructions executable to implement an out-of-band decryption module 680 are stored in memory 606. Out-of-band decryption module 580 includes the functionality needed to act as a source and/or intermediary (e.g., to perform one of the methods illustrated in FIGS. 2 and 3). One or more master keys and/or one or more sets of session key information 656 can also be stored in memory 606.

If network device 500 is an intermediary device, program instructions executable to implement a policy enforcement processor 581 can also be stored in memory 606. Such a policy enforcement processor can implement a policy enforcement device such as a firewall, Unidirectional Link Detection (URLF) device, lawful intercept device, Wide Area Application Services (WaaS) core device, or the like.

Various messages, including special out-of-band messages like a discovery message 658, a request for master key message 660, and a session key information message 662 (e.g., containing a set of session key information encrypted using a master key) can be stored in memory 608. Other messages, such as encrypted message 664, can also be stored in memory 608. These messages can be stored in memory 608 prior to being sent on a network via port 652 and/or in response to being received from a network via port 652.

The program instructions and/or data executable to implement out-of-band decryption module 580 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method comprising:
prior to a protocol successfully establishing an encrypted communication session between a source device and a destination device, wherein the source device sends messages to the destination device as part of the encrypted communication session established between the source device and the destination device, wherein the destination device is configured to use session key information to decrypt encrypted payloads within the messages, wherein the encrypted payloads are encrypted by the source device and sent to the destination device by the source device as part of the encrypted communication session, wherein the encrypted payloads are sent to the destination device via an intermediary device, wherein the intermediary device is neither the source device nor the destination device:
sending a discovery message from the source device to the destination device, wherein the discovery message indicates that the source device will be sending one or more messages comprising encrypted payloads to the destination device via a network;
sending a master key from the source device to the intermediary device, subsequent to the sending the discovery message; and
sending the session key information, encrypted using the master key, from the source device to the intermediary device, wherein the session key information is usable by the intermediary device to decrypt the encrypted payloads within a message in the encrypted communication session between the source device and the destination device.

2. The method of claim 1, further comprising the source device receiving a request message from the intermediary device, subsequent to the sending the discovery message, wherein the sending the master key is performed in response to the receiving the request message, and wherein the session key information is used by the intermediary device to decrypt the encrypted payloads within the message in the encrypted communication session between the source device and the destination device, wherein if the session key information is not sent to the intermediary device, the encrypted communication session between the source device and the destination device is not successfully established.

3. The method of claim 1, further comprising sending a second discovery message from the source device to a second destination device, prior to a second protocol successfully establishing a second encrypted communication session between the source device and the second destination device, wherein the source device sends second messages to the second destination device as part of the second encrypted communication session.

4. The method of claim 1, further comprising:
sending the master key to a plurality of second intermediary devices; and
sending the session key information, encrypted using the master key, to the plurality of second intermediary devices.

5. The method of claim 1, further comprising:
verifying a security credential received from the intermediary device, prior to the sending the master key.

6. The method of claim 1, further comprising sending another set of session key information, also encrypted using the master key, to the intermediary device, wherein the other set of session key information is associated with another encrypted communication session.

7. A system comprising:
one or more processors; and
a memory, wherein the memory is configured to store program instructions executable by the one or more processors to:
send a discovery message from the system to a destination device, wherein the discovery message indicates that the system will be sending one or more messages comprising encrypted payloads via a network as part of an encrypted communication session established between the system and the destination device, wherein the destination device is configured to use session key information to decrypt the encrypted payloads within the one or more messages, wherein the encrypted payloads are encrypted by the system and sent to the destination device by the system as part of the encrypted communication session, wherein the encrypted payloads are sent to the destination device via an intermediary device, wherein the intermediary device is neither a source device nor the destination device;
send a master key from the system to the intermediary device, subsequent to the system sending the discovery message, and prior to a protocol successfully establishing the encrypted communication session between the system and the destination device, wherein the system sends messages to the destination device as part of the encrypted communication session; and
send the session key information, encrypted using the master key, from the system to the intermediary device, prior to the protocol successfully establishing the encrypted communication session between the system and the destination device, wherein the session key information is usable by the intermediary device to decrypt the encrypted payloads within the one or more messages in the encrypted communication session between the system and the destination device.

8. The system of claim 7, wherein the program instructions are further executable by the one or more processors to detect receipt of a request message from the intermediary device by the system, subsequent to the discovery message being sent, wherein the master key is sent in response to receipt of the request message, and wherein the session key information is used by the intermediary device to decrypt the encrypted payloads within the message in the encrypted communication session between the source device and the destination device.

9. The system of claim 7, wherein the program instructions are further executable by the one or more processors to send a second discovery message from the system to a second destination device, prior to a second protocol successfully establishing a second encrypted communication session between the system and the second destination device, wherein the system sends second messages to the second destination device as part of the second encrypted communication session.

10. The system of claim 7, wherein the program instructions are further executable by the one or more processors to:
send the master key to a plurality of second intermediary devices; and send the session key information, encrypted using the master key, to the plurality of second intermediary devices.

11. The system of claim 7, wherein the program instructions are further executable by the one or more processors to send an other set of session key information, also encrypted using the master key, to the intermediary device, wherein the other set of session key information is associated with another encrypted communication session.

12. A method comprising:
receiving a discovery message being sent from a source device to a destination device, wherein the discovery message indicates that the source device will be sending one or more messages comprising encrypted payloads via a network as part of an encrypted communication session established between the source device and the destination device, wherein the destination device is configured to use session key information to decrypt the encrypted payloads within the one or more messages, wherein the encrypted payloads are encrypted by the source device and sent to the destination device by the source device as part of the encrypted communication session, wherein the receiving is performed by an intermediary device, and wherein the intermediary device is neither the source device nor the destination device;
in response to the receiving discovery message, sending a request for a master key to the source device;
subsequent to receiving the master key, and prior to a protocol successfully establishing the encrypted communication session between the source device and the destination device, receiving the session key information for the encrypted communication session from the source device, wherein the session key information and the discovery message are not sent as part of the encrypted communication session;
decrypting the session key information, based upon the master key;
decrypting the encrypted payloads within the one or more messages being sent from the source device to the destination device in the encrypted communication session, based upon the decrypted session key information; and
performing policy enforcement processing on the one or more messages, subsequent to decrypting the encrypted payloads within the one or more messages, wherein the sending the request, the receiving the session key information, the decrypting the session key information, the decrypting the one or more messages, and the performing are performed by the intermediary device.

13. The method of claim 12, wherein the discovery message is not an encrypted message.

14. The method of claim 12, wherein the request for the master key comprises a security credential and a public key.

15. The method of claim 12, further comprising:
receiving a second set of session key information for a second encrypted communication session from the source device, prior to a second protocol successfully establishing the second encrypted communication session between the source device and a second destination device; and
decrypting the second set of session key information, based upon the master key.

16. The method of claim 12, further comprising:
receiving at least one of the one or more messages comprising the encrypted payloads prior to the receiving the session key information; and
temporarily storing the at least one of the one or more messages comprising the encrypted payloads until the receiving the session key information.

17. A network device comprising:
a port, wherein the port is configured to be coupled to a network, wherein the port is configured to receive a discovery message being sent from a source device to a destination device, a first message comprising a master key, a second message comprising session key information, and a message being sent from the source device to the destination device in an encrypted communication session, wherein the discovery message, the first message, and the second message are not part of the encrypted communication session, wherein the destination device is configured to use the session key information to decrypt an encrypted payload within the message, wherein the encrypted payload is encrypted by the source device and sent to the destination device by the source device as part of the encrypted communication session, and wherein the network device is neither the source device nor the destination device; and
a processor, configured as an decryption module, coupled to the port, wherein the decryption module is configured to:
request the master key from the source device, in response to receipt of the discovery message by the port, wherein the discovery message indicates that the source device will be sending one or more messages comprising encrypted payloads via a network as part of an encrypted communication session established between the source device and the destination device;
decrypt the session key information, based upon the master key, prior to a protocol successfully establishing the encrypted communication session between the source device and the destination device; and
decrypt the encrypted payloads within the one or more messages being sent from the source device to the destination device in the encrypted communication session, based upon the decrypted session key information; and
a policy enforcement processor coupled to the port, wherein the policy enforcement processor is configured to perform policy enforcement processing on the one or more messages, subsequent to the encrypted payloads within the one or more messages being decrypted.

18. The network device of claim 17, wherein the decryption module is further configured to detect reception of at least one of the one or more messages comprising the encrypted payloads by the port prior to reception of the second message by the port and to temporarily store the at least one of the one or more messages comprising the encrypted payloads until the reception of the session key information.

19. A system comprising:
discovery message sending means for sending a discovery message from a source device to a destination device, wherein the discovery message indicates that the source device will be sending one or more messages comprising encrypted payloads via a network as part of an encrypted communication session established between the source device and the destination device, wherein the destination device is configured to use session key information to decrypt the encrypted payloads within the one or more messages, wherein the encrypted payloads are encrypted by the source device and sent to the destination device by the source device as part of the encrypted communication session, and wherein the system is neither the source device nor the destination device;
master key sending means for sending a master key from the source device to a intermediary device via the network, subsequent to the discovery message being sent and prior to a protocol successfully establishing the encrypted communication session between the source device and the destination device, wherein the source device sends messages to the destination device as part of the encrypted communication session; and session key information sending means for sending the session key information, encrypted using the master key, from the source device to the intermediary device, prior to the protocol successfully establishing the encrypted communication session between the source device and the destination device, wherein the session key information is usable by the system to decrypt the encrypted payloads within the one or more messages in the encrypted communication session.

20. A system comprising:

discovery message receiving means for receiving a discovery message being sent from a source device to a destination device, wherein the discovery message indicates that the source device will be sending one or more messages comprising encrypted payloads via a network as part of an encrypted communication session established between the source device and the destination device, wherein the destination device is configured to use session key information to decrypt the encrypted payloads within the one or more messages, wherein the encrypted payloads are encrypted by the source device and sent to the destination device by the source device as part of the encrypted communication session, and wherein the system is neither the source device nor the destination device;

request sending means for sending a request for a master key to the source device, in response to receipt of the discovery message;

session key information receiving means for receiving the session key information for the encrypted communication session from the source device, prior to a protocol successfully establishing the encrypted communication session between the source device and the destination device, wherein the session key information and the discovery message are not sent as part of the encrypted communication session, and wherein the session key information is received subsequent to receipt of the master key;

session key information decrypting means for decrypting the session key information, based upon the master key;

message decrypting means for decrypting the encrypted payloads within the one or more messages being sent from the source device to the destination device in the encrypted communication session, based upon the decrypted session key information; and policy enforcement processing performance means for performing policy enforcement processing on the one or more messages, subsequent to decryption of the encrypted payloads within the one or more messages.

* * * * *